United States Patent
August

[11] Patent Number: 5,594,573
[45] Date of Patent: Jan. 14, 1997

[54] IMAGE DISPLAY GLASSES HAVING AN LCD FOR DISPLAYING AN IMAGE WHEREIN THE IMAGE PROVIDES FOR VIEWING BY OTHERS

[76] Inventor: Gregg D. August, 2757 Hawthorn, Cape Girardeau, Mo. 63701

[21] Appl. No.: 136,165

[22] Filed: Oct. 15, 1993

[51] Int. Cl.$^6$ ............ G02F 1/1335; G02F 1/1333; G02F 1/1347
[52] U.S. Cl. ............ 349/13; 349/58; 349/74; 359/630
[58] Field of Search ............ 359/83, 94, 630, 359/53, 40; 351/41, 158

[56] References Cited

U.S. PATENT DOCUMENTS

| | | | |
|---|---|---|---|
| 3,418,737 | 12/1968 | Lambert | 351/158 |
| 3,621,838 | 11/1971 | Harding et al. | 351/158 |
| 3,881,808 | 5/1975 | Gurtler et al. | 359/53 |
| 4,254,451 | 3/1981 | Cochran, Jr. | 362/103 |
| 4,257,691 | 3/1981 | Brooks | 351/158 |
| 4,485,376 | 11/1984 | Noble | 359/53 |
| 4,753,514 | 6/1988 | Kubik | 350/174 |
| 4,756,605 | 7/1988 | Okada et al. | 359/83 |
| 4,806,011 | 2/1989 | Bettinger | 351/158 |
| 4,822,161 | 4/1989 | Jimmy | 351/41 |
| 4,867,551 | 9/1989 | Perera | 351/158 |
| 4,870,486 | 9/1989 | Nakagawa et al. | 358/92 |
| 4,955,709 | 9/1990 | Smith | 345/46 |
| 4,991,951 | 2/1991 | Mizuno et al. | 351/41 |
| 5,003,300 | 3/1991 | Wells | 345/8 |
| 5,033,818 | 7/1991 | Barr | 350/174 |
| 5,060,062 | 10/1991 | Dotson | 358/94 |
| 5,276,539 | 1/1994 | Humphrey | 359/40 |
| 5,281,957 | 1/1994 | Schoolman | 345/8 |
| 5,296,952 | 3/1994 | Takatsu et al. | 359/53 |
| 5,347,400 | 9/1994 | Hunter | 359/630 |

FOREIGN PATENT DOCUMENTS 8802494  4/1988  WIPO ............ 359/630

Primary Examiner—Anita Pellman Gross
Assistant Examiner—Toan Ton
Attorney, Agent, or Firm—Paul M. Denk

[57] ABSTRACT

Glasses include lens assemblies held by a frame to be worn by a user. The lens assemblies have liquid crystal displays which are operatively connected to a PC board mounted on the frame. The printed circuit board drives the liquid crystal display to produce animated images which may be seen by one facing the wearer. A battery mounted on the frame powers the chip and PC board.

7 Claims, 3 Drawing Sheets

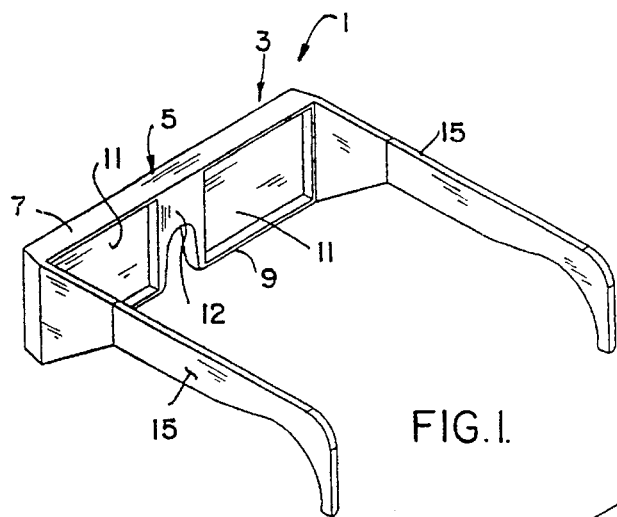
FIG. 1.
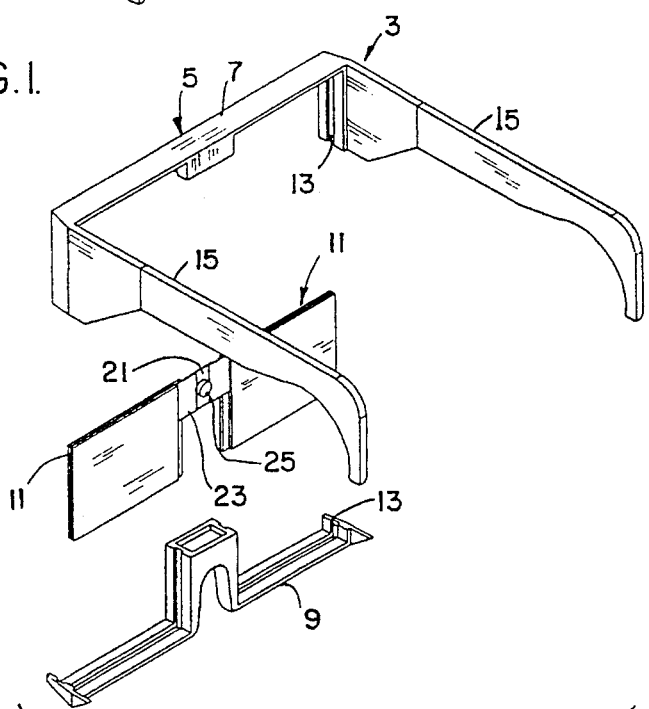
FIG. 2.
SEQUENCE OF ANIMATION
| STEP# | ENERGIZED CRYSTALS |
|---|---|
| 1 | B1 |
| 2 | B2, C1 |
| 3 | B3, C2 |
| 4 | B4, C3 |
| 5 | B5, C4 |
| 6 | B4, C5 |
| 7 | B3 |
| 8 | B2 |
REPEAT STEPS 1 TROUGH 8 CONTINUOUSLY
FIG. 3B.
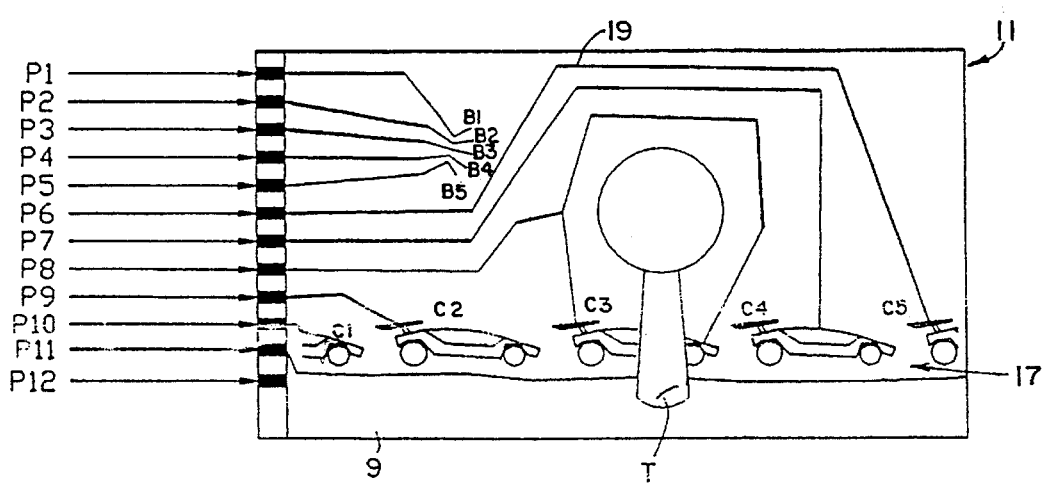
FIG. 3A.

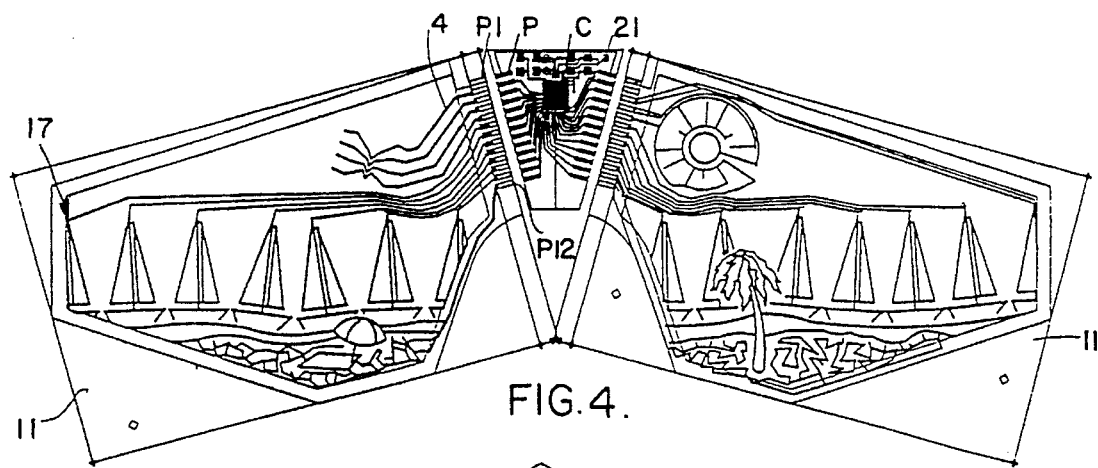
FIG. 4.
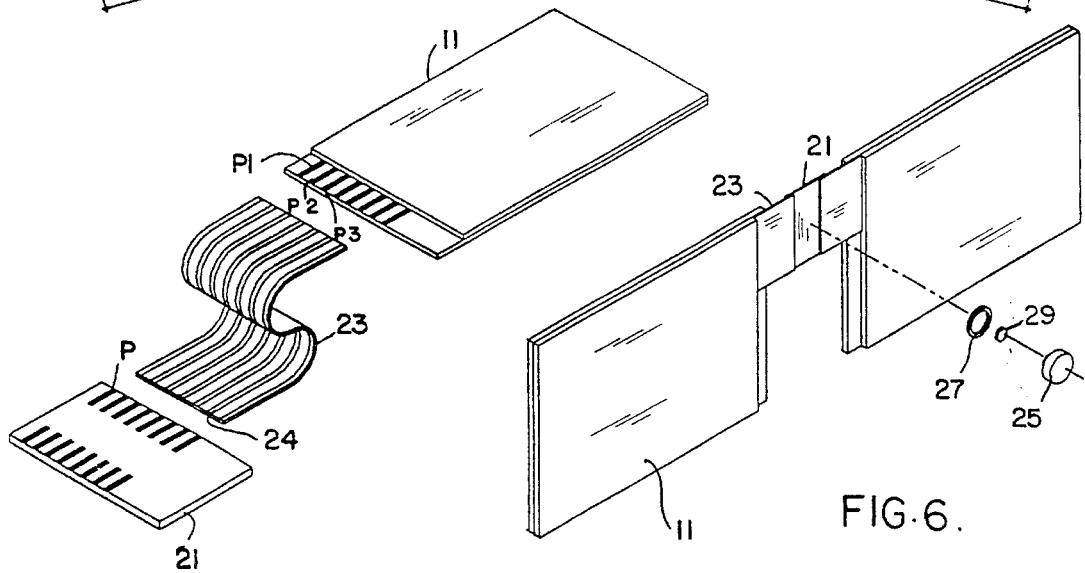
FIG. 5.
FIG. 6.
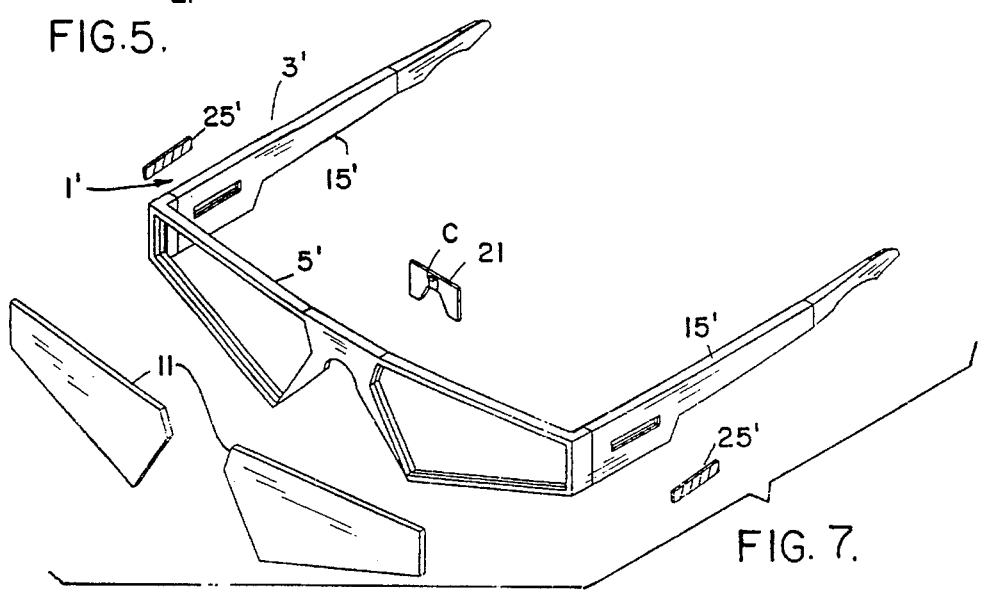
FIG. 7.

IMAGE DISPLAY GLASSES HAVING AN LCD FOR DISPLAYING AN IMAGE WHEREIN THE IMAGE PROVIDES FOR VIEWING BY OTHERS

BACKGROUND OF THE INVENTION

This invention relates to glasses, and in particular, to glasses having an animated and image display which can be seen by one facing the wearer.

Glasses that may be worn and which provide displays are known. For example, U.S. Pat. No. 3,418,737 to Lambert provides a pair of glasses which has paddles or plaques upon which a message can be written and which are selectively displayable by the wearer.

U.S. Pat. No. 3,621,838 to Harding et al and U.S. Pat. No. 4,254,451 to Cochran, Jr. provide glasses which have energizable sources of light. The lights of Cochran, Jr. may be sequentially lit.

U.S. Pat. No. 4,257,691 to Brooks discloses a pair of glasses to which supplemental prisms may be secured. The prisms are operated to provide a display.

The patent to Mizuno, et al, U.S. Pat. No. 4,991,951, shows an eyeglass frame for electrooptical lenses. The lenses do include the use of electrochromic devices, or a liquid crystal device, which utilizes a conductive metal in the fabrication of the frames, including the temple part, in order to provide conductivity of charge, for the pair of lenses, as shown. Apparently the lenses have laminated thereon the electrooptical devices, which have the electrochromatic properties. Thus, when power is supplied through the upper and lower segments of the frame, and passes a charge into the electrooptical devices formed on the lenses, apparently it provides some form of illumination, although the patent really does-not define exactly what type of data is displayed, or what happens when the liquid crystal devices are energized. The device, though, does appear to utilize first and second rim members, which comprise different parts of the rim, for forming its conductive metal, and which are mutually insulated electrically, from each other, with each part connecting with a pair of electrodes, secured to each of its optical members, so that when a voltage is supplied therebetween, electric supply of charge passes to the electrooptical device, and its lenses.

The patent to Kubik, U.S. Pat. No. 4,753,514, shows a headwear-mounted periscopic display device. The patent to Bettinger, U.S. Pat. No. 4,806,011, shows a spectacle-mounted occular display apparatus. The patent to Jimmy, U.S. Pat. No. 4,822,161, discloses an illuminating spectacle apparatus. The patent to Perera, U.S. Pat. No. 4,867,551, shows another display projection optical system for spectacles or sunglasses.

The patent to Barr, U.S. Pat. No. 5,033,818, shows an electronic driving system and face mask display.

Finally, the patent to Dotson, U.S. Pat. No. 5,060,062, shows an electronic vision aid device.

SUMMARY OF THE INVENTION

One object of the invention is to provide glasses which produce an image on lenses thereof which is visible to one observing the lenses.

Another object is to provide such a pair of glasses wherein the image is animated.

A further object of this invention is to provide a pair of glasses which incorporate miniature electronics, which can be easily applied to the frame of the glasses, to furnish the above results, without being too noticeable in its integration within the frame structure for the glasses.

Yet another object of this invention is to provide an electronic means for furnishing animation to the lens viewed glasses.

These and other objects will become apparent to those skilled in the art in light of the following disclosure and accompanying drawings.

In accordance with this invention, generally stated, a pair of image display glasses include a transparent lens assembly, a frame which hold the lens assembly, and a liquid crystal display contained in the lens assembly. The liquid crystal display contains a plurality of energizable crystals arranged in the form of a desired image which are selectively energized by an electronic circuit to produce a visible image. The image may be any desired image. By providing a plurality of like images across the display, the display may be made to be animated by sequentially energizing the images. The electronic circuit is powered by a battery which is mounted in the frame of the glasses.

In one embodiment, the wearer may selectively operate or change the image displayed. In this embodiment, the lens assembly includes a liquid crystal display, embodied in the lens, to provide for the animated display. The computer includes a switching element to selectively switch between the displays to operate a desired and selected display. The switch element is made up of a plurality of jumpers connected on one side to a common port and on the other side to individual ports. The jumpers generally are connected and set at the time of manufacturing, of the liquid crystal display lenses, to provide for the selected image display. The jumpers may be selectively opened and closed to selectively switch between said displays. In addition, it is likely that the lenses may be stacked, where each lens assembly may include a plurality of stacked liquid crystal displays within the laminated lenses, to provide for the fabrication of the lens for use in the glasses of this invention.

The particular circuit board, printed circuit, or electronic chip utilized in this invention, as modified, to provide the display as desired by applicant, as can be hereinafter reviewed, may comprise one manufactured under Model No. KS56C220, by Samsung Semiconductor, Inc., of San Jose, Calif. The particular computer functions as generated by the chip, can be seen from the print-out of the source code provided in the Appendix A, which is appended to this application, and is incorporated herein by reference as part of the disclosure of this invention.

BRIEF DESCRIPTION OF THE DRAWINGS

FIG. 1 is a rear perspective view of an embodiment of the glasses of the present invention;

FIG. 2 is an exploded view of the glasses of FIG. 1;

FIG. 3A is a plan view of a liquid crystal display of the glasses;

FIG. 3B is a chart showing an example of sequences of animations that may be illustrated through usage of these glasses.

FIG. 4 is a plan view of left and right Liquid Crystal Displays connected to a PC board;

FIG. 5 is an exploded view of the connection of a liquid crystal display to a PC board;

FIG. 6 is an exploded view showing the mounting of a battery to a lens assembly;

FIG. 7 is an exploded view of another embodiment of the glasses of the present invention.

DESCRIPTION OF THE PREFERRED EMBODIMENT

Figure 8:
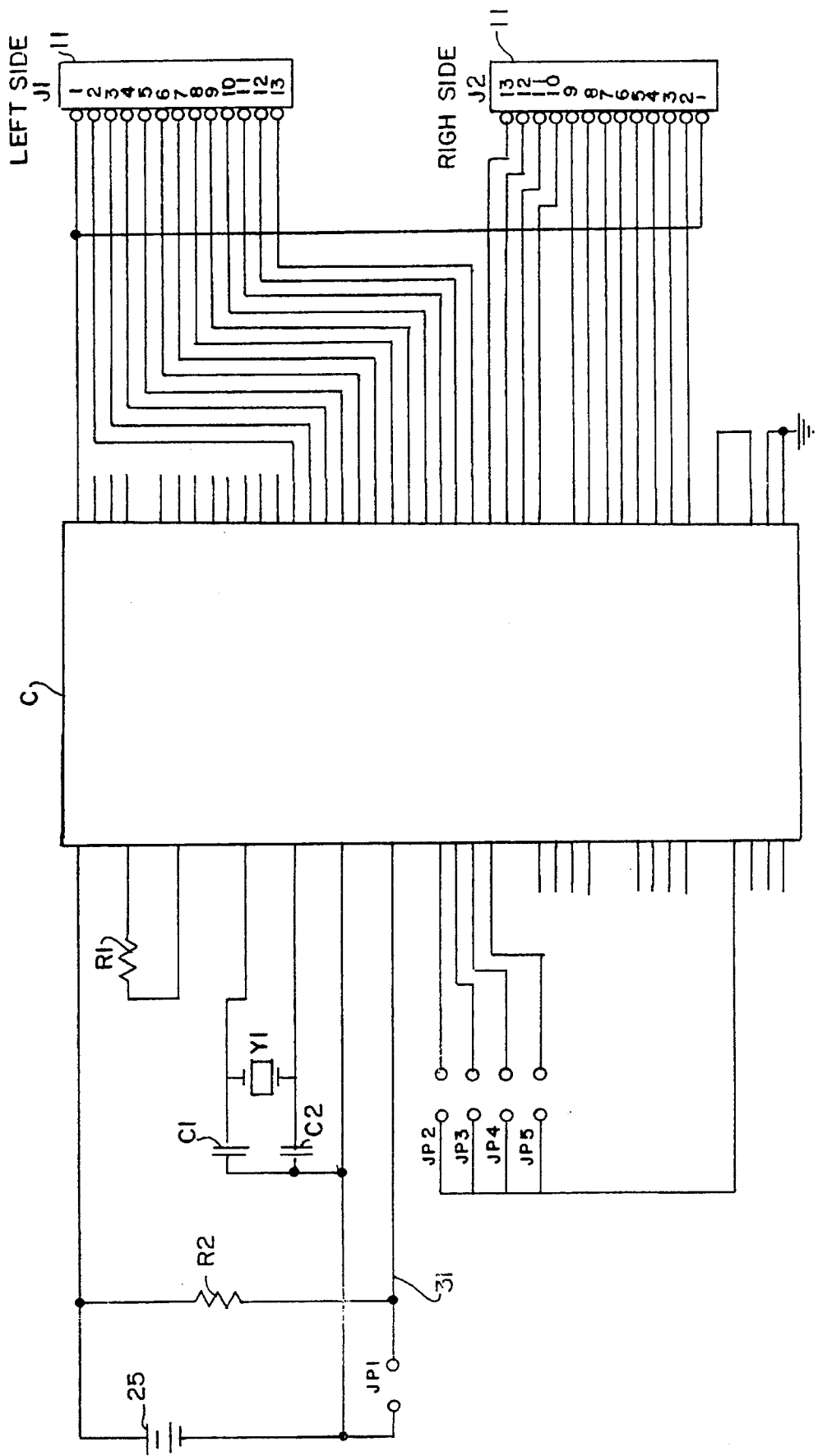
FIG. 8 is an electrical schematic of the connections between the liquid crystal display, PC board and battery.

Referring now to the FIG. 1, reference numeral 1 indicates one illustrative embodiment of image display glasses of the present invention. Glasses 1 include a frame 3 having a lens frame 5. Lens frame 5 has a top portion 7 and a bottom portion 9 which are joined integrally together to hold a pair of lenses 11. Lenses 11 are separated by a bridge 12 of frame 5. As can be seen in FIG. 2, lens frame 5 has a groove 13 in both the top and bottom portions which accept the lenses 11 to hold the lenses in lens frame 5 when assembled. A pair of arms 15 are hingedly secured to lens frame 5. Arms 15 extend rearwardly a distance sufficient to reach a wearer's ears, so that glasses 1 may be worn as is known in the art.

An illustrative embodiment of a lens 11 is shown in FIG. 3A. Lens 11 is transparent, so that a wearer may view therethrough. However, it includes a liquid crystal display 17 which, as is explained below, may be energized to be seen by one facing the wearer of the glasses. The display 17 of lens 11 consists of birds, B1–B5, and cars C1–C5 against a background of a tree T. Each part of the display, i.e. elements B1–B5, C1–C5 and T are crystals of the Liquid Crystal Display arranged to produce a desired image. By selectively energizing the various elements, a desired image can be created. Further, by energizing elements B1–B5 and elements C1–C5 sequentially, the image can appear to be animated.

A plurality of connectors P1–P12 are arranged along an edge of lens 11. Preferably, the connectors are arranged along the inner edge, or edge adjacent the wearer's nose, of lens 11. Each of the separate parts of display 17 are operatively connected to one of the connectors P1–P12 by wires 19.

FIG. 3B shows a sequence of animations for the birds B and cars C, that may be displayed through usage of the glasses. Obviously, other displays may be illustrated and sequenced.

FIG. 4 shows a pair of lenses 11 having a display 17 showing sailboats and a beach rather than the cars of FIG. 3. As seen in FIG. 4, the contacts P1–P12 are connected to a PC board 21 via a connector 23. The connector 23, as is shown in FIG. 5, is preferably a flexible conductor which has wires 24 extending therethrough which connect the individual ports of display 17 to individual ports P of PC board 21. Ports P of PC board 21 are operatively connected to a computer C, chip, or electronic circuit which selectively energizes the elements of display 17. By selectively energizing and deenergizing the selective elements, the car or boat can be made to appear to move across the lens 11 and the bird can be made to appear to fly. Display 17 is thus animated. Computer C is powered by a battery 25 which is secured to the back of PC board 21, as seen in FIG. 6. A conductive rubber ring 27 and button 29 are electrically connected to computer C and make contact with the opposite poles of battery 25 to power computer C. As seen in FIG. 1, the PC board 21 and battery 25 are enclosed in, and thus protected by, frame bridge 12.

In FIG. 7, a pair of glasses 1' show an alternate manner of powering computer C. In glasses 1', solar cells 25' are secured to frames 3' preferably in the lateral arms 15'. Solar cells are electrically connected to computer C to power computer C.

FIG. 8 shows the electrical connections of computer C. Computer C is preferably a microprocessor, such as the aforesaid microprocessor model KS56C220 manufactured by Samsung Semiconductor, Inc. of San Jose, Calif. This model can drive up to 128 individual liquid crystal segments and contains two kilobytes of read-only memory (ROM), 300 bytes of random access memory (RAM), two counter/timers, a sound output channel, five input/output (I/O) ports. The use of this microprocessor, or its equivalent, enables the stacking of various and different liquid crystal displays so that the wearer may choose among the displays to operate a desired display. The display may thus be selectively altered by the wearer. The computer operations and source code of this microprocessor are those as shown in Appendix A.

The connections of computer C are made as follows. A 100K ohm resistor R1 is connected between the $X_{IN}$ and $X_{OUT}$ ports to set the frequency of the main system clock oscillator to one Mhz. A 22 pf capacitor C1 and a 33 pf capacitor C2 are connected in series between pins $XT_{IN}$ and $XT_{OUT}$. A 32.768 Khz crystal Y1 is connected in parallel with capacitors C1 and C2 to set the frequency of the sub-system clock oscillator. Battery 25 is preferably a 3V lithium watch battery having a 30 mAh capacity. It is connected between pins VDD and VSS. The battery is also connected to a "reset" pin via a line 31. A 100K ohm resistor R2 is connected in parallel with battery 25 between pin VDD and wire 31. A jumper or switch JP1 is located in line 31 between resistor R2 and battery 25. The computer is reset by connecting or closing jumper JP1 and operates when jumper JP1 is open. Jumper JP1 may be connected to a momentarily-on switch for "reset".

Jumpers JP2–JP5 may be selectively opened and closed to operated up to sixteen different programs. In this manner, the glasses 1 may be operated so that a desired, pre-programmed display can be used to actuate lenses 11. This may be accomplished by having a different liquid crystal display 17 for each different program. The program jumpers are connected to input port 1, shown as P1.0, P1.1/INT1, P1.2/INT2 and P1.3/TCL in FIG. 8. The common side of the program jumpers are connected to output port 6, bit zero (P6.0/KSO).

The liquid crystal displays of lenses 11 are connected to segment pins SEG8–SEG31 of computer C to control the liquid crystal displays. Pins SEG8–SEG19 control one display (e.g. the right display), and pins SEG20–SEG31 control the display of the other lens. Port P1 of each display is connected to pin COM0 of computer C. Pins BIAS and VLC0 are connected together and pins VLC1 and VLC2 are connected to ground.

As can be appreciated, the liquid crystal displays which are made part of glasses 1 can be operated to create a desired display. By selective operation of the computer C, glasses 1 may be operated to show different displays.

The foregoing description was set forth for illustrative purposes only. Variations, within the scope of the appended claims, may become apparent to those skilled in the art. For example, different power sources such as a battery pack, may be used. Any desired display may be shown. A single, wrap around lens may be substituted for the two lenses used. A switch may be added to turn the battery power on and off. These examples are merely illustrative.

Having thus described the invention, what is claimed and desired to be secured by Letters Patent is:

1. Image display glasses comprising a pair of lenses:

a transparent lens assembly for each of said lenses;

a frame which holds said lens assemblies;

said glasses capable of displaying an animated image viewable from the front of said lens assemblies;

a liquid crystal display contained sandwiched in each said lens assembly, said liquid crystal display containing a plurality of energizable crystals;

electronic means contained within said frame and operatively connected to said liquid crystal display for selectively activating said crystals to produce a visible image;

program means contained within said frame and for use for controlling the sequence of operations of the electronic means in selectively activating said liquid crystal displays;

a source of battery current within said frame operatively connected to said electronic means;

said electronic means selectively energizing said crystals to produce an animated display in each lens assembly;

said electronic means comprising a PC board which cooperates with the program means for selectively inducing said animated display; and whereby the induced animated display upon the front surface of the lens assembly provides for viewing by others rather than the wearer of said image display glasses, without completely obstructing viewing by the wearer of said glasses.

2. The image display glasses of claim 1 wherein said source of current is a solar battery.

3. The image display glasses of claim 1 and further including means for selectively altering the animated image produced in the lens assemblies.

4. The invention of claim 3 wherein said means for altering said image includes at least two liquid crystal displays stacked in said frame, said programmed means including means for switching between said displays to selectively operate the desired animated display.

5. The image display glasses of claim 4 wherein said switching means includes a plurality of jumpers.

6. The image display glasses of claim 5 wherein said jumpers are each connected on one side of the lens assembly to separate ports, and on another side of the lens assembly to a common port, said jumpers being selectively openable and closable to selectively switch between said animated displays.

7. The invention of claim 1 wherein said electronic means includes resistor means connected in parallel across said battery, a pair of capacitors connected in series with said resistor, computer means containing a clock oscillator, a crystal means connected in parallel with said capacitors to set the frequency of the said clock oscillator, jumper means connecting with the output of the crystal means and cooperating with the program means to conduct charge to the liquid crystal display within the lens assemblies for furnishing an animated display to an observer.

* * * * *